United States Patent
Lagasse

(10) Patent No.: US 7,610,770 B2
(45) Date of Patent: Nov. 3, 2009

(54) COOLING TOWER SEAL JOINT

(75) Inventor: Joseph C. Lagasse, Eldersburg, MD (US)

(73) Assignee: Baltimore Aircoil Company, Inc., Jessup, MD (US)

( * ) Notice: Subject to any disclaimer, the term of this patent is extended or adjusted under 35 U.S.C. 154(b) by 434 days.

(21) Appl. No.: 11/800,307

(22) Filed: May 4, 2007

(65) Prior Publication Data
US 2008/0272559 A1    Nov. 6, 2008

(51) Int. Cl.
F25D 19/00    (2006.01)
(52) U.S. Cl. .............................. 62/297; 62/295; 62/304; 62/259.1
(58) Field of Classification Search .................... 62/295, 62/297, 304, 259.1; 312/406.2, 401
See application file for complete search history.

(56) References Cited

U.S. PATENT DOCUMENTS 2,636,371 A * 4/1953 Stephens ..................... 62/314
2,845,321 A * 7/1958 Saunders et al. ............ 312/405

* cited by examiner

Primary Examiner—Cheryl J Tyler
Assistant Examiner—Lakiya Rogers
(74) Attorney, Agent, or Firm—Edward J. Brosius

(57) ABSTRACT

An assembly for connecting two vertically aligned cooling tower modules is provided. The assembly includes a lower module with a top structural edge and an upper module with a bottom structural edge. The top structural edge of the lower module includes an outer structural component and an inner sealing component. The bottom structural edge of the upper module includes an outer structural component and an inner sealing component. The outer structural component of the lower module has a generally flat surface that supports the bottom generally flat surface of the outer structural component of the top module. The inner sealing component of the top structural edge of the lower module includes a generally flat surface that abuts the inner generally flat surface of the outer structural component of the top structural edge of the lower module. The bottom generally flat surface of the inner sealing component of the bottom structural edge of the upper module is adjacent the top generally flat surface of the inner sealing component of the top structural edge of the lower module and a sealing component extends between such opposed flat surfaces.

20 Claims, 2 Drawing Sheets

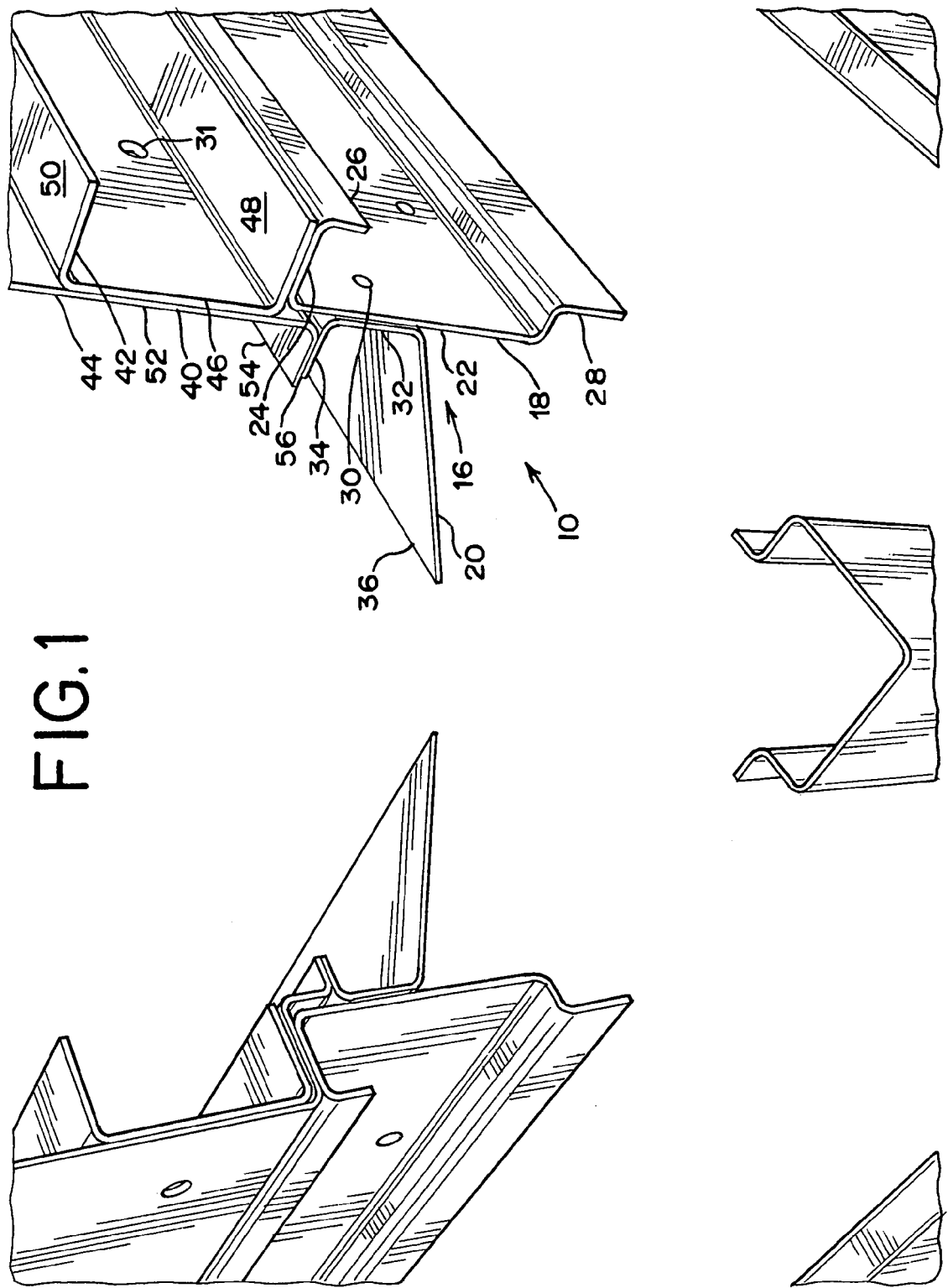

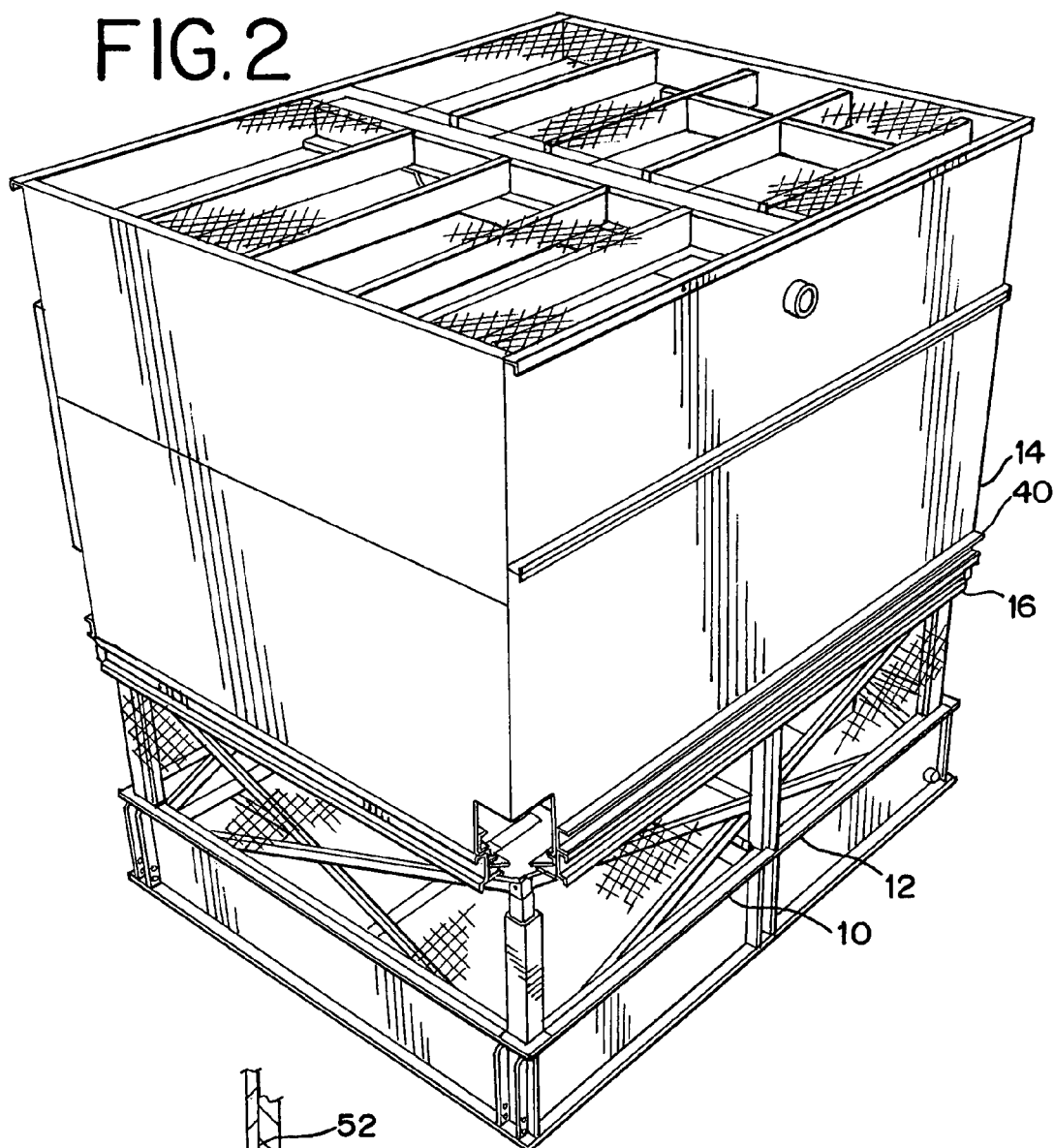
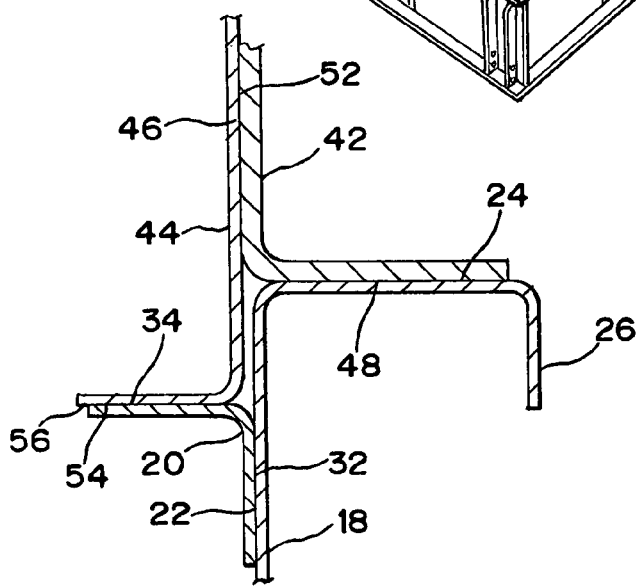

COOLING TOWER SEAL JOINT

BACKGROUND OF THE INVENTION

The present invention relates to an assembly for connecting two adjacent cooling modules and, more particularly, a field joint for connecting two vertically adjacent evaporative cooling modules.

The present invention addresses a need in connecting two vertically adjacent evaporative cooling modules in devices such as cooling towers. A concern in connecting such vertically adjacent modules is the need to seal the modules to prevent the operating liquid, which is usually water, from exiting between the two adjacent modules.

Cooling towers are frequently comprised of vertically stacked components or modules. Such modules usually contain evaporative cooling equipment such as fill, which is usually referred to as a direct cooling module, or a plurality of coils through which a liquid to be cooled passes, with such a liquid being cooled indirectly by the passage of water over the outside of the coil. As the cooling liquid, which is usually water, passes vertically through the vertically adjacent cooling tower modules, it can be readily understood that it is desirable to keep the cooling water within the cooling tower itself.

Accordingly, it is an object of the present invention to provide a field joint for use between vertically adjacent cooling tower modules.

It is a further object of the present invention to provide a field joint for use between vertically adjacent cooling tower modules that seals the modules so as to keep the working liquid within the cooling tower.

SUMMARY OF THE INVENTION

The present invention provides a joint assembly for two vertically adjacent cooling tower modules. Each cooling tower module usually contains evaporative cooling equipment in the form of direct or indirect evaporative cooling assemblies. The lower module is said to include a top structural edge which itself is comprised of an outer structural component and an inner sealing component. The outer structural component has an inner facing generally flat surface and a top facing generally flat surface. The inner sealing component of the top structural edge of the lower module has an outer facing generally flat surface that abuts the inner generally flat surface of the outer structural component. The inner sealing component of the top structural edge of the lower module also has a top facing generally flat surface.

The upper module of the cooling tower assembly is said to have a bottom structural edge. The bottom structural edge is comprised of an outer structural component and an inner sealing component. The outer structural component of the bottom structural edge of the upper module has an inner facing generally flat surface and a bottom facing generally flat surface. The bottom generally flat surface of the outer structural component of the bottom structural edge of the upper module is adjacent and is supported by the top facing generally flat surface of the outer structural component of the outer structural edge of the lower module. The inner sealing component of the bottom structural edge of the upper module has an outer generally flat surface that abuts the inner generally flat surface of the outer structural component of the bottom structural edge of the upper module. The inner sealing component of the bottom structural edge of the upper module also has a bottom facing generally flat surface. The bottom facing generally flat surface of the inner sealing component of the bottom structural edge of the upper module is adjacent the top generally flat surface of the inner sealing component of the top structural edge of the lower module. Further, a sealing material can be located between the bottom generally flat surface of the inner sealing component of the bottom structural edge of the upper module and the top generally flat surface of the inner sealing component of top structural edge of the lower module.

The field joint or connecting assembly is seen to provide a water tight seal between the bottom structural edge of the upper module of the cooling tower and the top structural edge of the lower module of the cooling tower. Thereby the working fluid within the cooling tower, which is usually water, is kept within the cooling tower for more efficient operation of the cooling tower.

DESCRIPTION OF THE DRAWINGS

Referring to the drawings,

FIG. 1 is a partial perspective view, in partial cross section, of a field joint connection assembly in accordance with one embodiment of the present invention;

FIG. 2 is a perspective view of a cooling tower with a partial cross section showing the field joint connecting assembly in accordance with an embodiment of the present invention, and FIG. 3 is a detailed partial cross sectional view of a field joint connecting assembly in accordance with an embodiment of the present invention.

DETAILED DESCRIPTION OF THE INVENTION

Referring to FIG. 2 of the drawings, a cooling tower is seen to comprise two evaporative cooling modules, the lower module 12 supporting the vertically aligned upper module 14. It is understood that a working fluid, usually water, is sprayed downwardly through upper module 14 across either a direct evaporative cooling arrangement such as fill or an indirect evaporative cooling arrangement such as a plurality of coils. The water then passes from upper module 14 into lower module 12. The connecting assembly or joint is shown as extending between the top structural edge 16 of lower module 12 to support the bottom structural edge 40 of upper module 14.

Referring now to FIGS. 1 and 3, detailed views of the field joint connection assembly 10 in accordance with an embodiment of the present invention is set forth. Connecting assembly 10 is seen to be comprised of the intersection or connection between top structural edge 16 of lower cooling tower module 12 and the bottom structural edge 40 of upper cooling tower module 14. It should first be understood that top structural edge 16 and bottom structural edge 40 are mainly comprised of structural steel components, which can be either comprised of galvanized steel with or without an additional paint or of coating or stainless steel or a structural plastic or fiber glass. Further, it should be understood that the outer walls and other components of lower cooling tower module 12 and upper cooling tower module 14 are similarly comprised of steel sheets either of galvanized steel which may or may not be coated or painted or of stainless steel or of a structural plastic or fiber glass.

Top structural edge 16 of lower cooling tower module 12 is seen to comprise outer structural component 18 and inner sealing component 20. Outer structural component 18 is seen to have an inner facing generally flat surface 22 and a top generally flat surface 24 which is, usually perpendicular to inner facing generally flat surface 22. Outer lip 26 is seen to extend downwardly from and perpendicular to top generally flat surface 24. Further, lower lip 28 is seen to extend from a lower portion of outer structural component 18.

Inner sealing component 20 is usually comprised of a galvanized or stainless steel or a structural plastic. Inner sealing component 20 is seen to include an outer facing generally flat surface 32 and a top facing generally flat surface 34 that is usually perpendicular to outer facing generally flat surface 32. Further, inner lip 36 is seen to extend at an acute angle from outer facing generally flat surface 32. Fastening openings 30 are seen to allow for bolts, rivets, spot welds or similar mechanical fixing or welding or gluing between the facing generally flat surface 32 of inner sealing component 20 and inner facing generally flat surface 22 of outer structural component 18.

Bottom structural edge 40 is seen to be the lower structural component of upper module 14. Bottom structural edge 40 is seen to comprise an outer structural component 42, which is usually a structural steel member or bent sheet of galvanized or stainless steel or a structural plastic which includes a bottom generally flat surface 48, an inner facing generally flat surface 46 which is usually perpendicular to bottom generally flat surface 48, and a top generally flat surface 50 which is seen to also be usually perpendicular to inner facing generally flat surface 46. Bottom structural edge 40 is also seen to comprise an inner sealing component 44, which is usually comprised of a bent sheet of galvanized steel or stainless steel or a structural plastic. Inner sealing component 44 is seen to comprise a bottom facing generally flat surface 54, an outer facing generally flat surface 52 extending usually perpendicular to bottom facing generally flat surface 54. Outer facing generally flat surface 52 of inner sealing component 44 is seen to face and abut inner facing generally flat surface 46 of outer structural component 42. A plurality of openings 31 are seen to extend between inner facing generally flat surface 46 and outer facing generally flat surface 52 to allow rivets, bolts or other mechanical fixing mechanisms or spot welding or gluing other ways of joining inner sealing component 44 to outer structural component 42.

Further, bottom facing generally flat surface 54 of inner sealing component 44 of bottom structural edge 40 of upper module 14 is seen to face and be supported on top facing generally flat surface 34 or of inner sealing component 20 of top structural edge 16 of lower module 12.

Further, sealing component 56 can be located between bottom facing generally flat surface 54 and top facing generally flat surface 34 of inner sealing component 20. Sealing component 56 can be comprised of a butyl tape, an appropriately chosen caulk such as an acrylic or silicon caulk, or other sealing component such as a rubber gasket.

Further, it should be noted that bottom generally flat surface 48 of outer structural component 42 of bottom structural edge 40 of upper module 14 is seen to face and be supported on top facing generally flat surface 24 of outer structural component 18 of top structural edge 16 of lower module 12.

It should also be noted that the junction between top facing generally flat surface 34 of inner sealing component 20 of top structural edge 16 of lower module 12 and bottom facing generally flat surface 54 of inner sealing component 44 of bottom structural edge 40 of upper module 14 is located below the junction between bottom generally flat surface 48 of outer structural component 42 of bottom structural edge 40 of upper module 14 and top facing generally flat surface of outer structural component 18 of top structural edge 16 of lower module 12.

What is claimed is:

1. An assembly for connecting two evaporative cooling modules, the assembly comprising
   a lower module having evaporative cooling components and a top structural edge,
   an upper module having evaporative cooling components and a bottom structural edge,
   the top structural edge of the lower module comprising an outer structural component and an inner sealing component,
   the outer structural component of the top structural edge of the lower module having an inner generally flat surface and top generally flat surface,
   the inner sealing component of the top structural edge of the lower module having an outer generally flat surface that abuts the inner generally flat surface of the outer structural component of the top structural edge of the lower module,
   the inner sealing component of the top structural edge of the lower module having a top generally flat surface,
   the bottom structural edge of the upper module comprising an outer structural component and an inner sealing component,
   the outer structural component of the bottom structural edge of the upper module having an inner generally flat surface and a bottom generally flat surface,
   the bottom generally flat surface of the outer structural component of the bottom structural edge of the upper module being adjacent and supported by the top generally flat surface of the outer structural component of the top structural edge of the lower module,
   the inner sealing component of the bottom structural edge of the upper module having an outer generally flat surface that abuts the inner generally flat surface of the outer structural component of the bottom structural edge of the upper module,
   the inner sealing component of the bottom structural edge of the upper module having a bottom generally flat surface,
   and the bottom generally flat surface of the inner sealing component of the bottom structural edge of the upper module being adjacent the top generally flat surface of the inner sealing component of the top structural edge of the lower module.

2. The assembly of claim 1
   wherein a sealing material extends between the bottom generally flat surface of the inner sealing component of the bottom structural edge of the upper module
   and the top generally flat surface of the inner sealing component of the top structural edge of the lower module.

3. The assembly of claim 2
   wherein the sealing material is a butyl tape.

4. The assembly of claim 2
   wherein the sealing material is a acrylic caulk.

5. The assembly of claim 2
   wherein the sealing material is a rubber gasket.

6. The assembly of claim 1
   wherein the outer structural component of the bottom structural edge of the upper module is a channel structural member.

7. The assembly of claim 1
   wherein the inner generally flat surface of the top structural edge of the lower module is generally perpendicular to the top generally flat surface of the top structural edge of the lower module.

8. The assembly of claim 1
wherein the top generally flat surface of the inner sealing component of the top structural edge of the lower module is generally perpendicular to the outer generally flat surface of the inner sealing component of the top structural edge of the lower module.

9. The assembly of claim 1
wherein the bottom generally flat surface of the outer structural component of the bottom structural edge of the upper module is generally perpendicular to the inner generally flat surface of the outer structural component of the bottom structural edge of the upper module.

10. The assembly of claim 1
wherein the bottom generally flat surface of the inner sealing component of the bottom structural edge of the upper module is generally perpendicular to the outer generally flat surface of the inner sealing component of the bottom structural edge of the upper module.

11. The assembly of claim 1
wherein the bottom generally flat surface of the inner sealing component of the bottom structural edge of the upper module is located below the bottom generally flat surface of the outer structural component of the bottom structural edge of the upper module.

12. An evaporative cooling assembly for connecting two modules, the assembly comprising
a lower module having a top structural edge,
an upper module having a bottom structural edge,
the top structural edge of the lower module comprising an outer structural component and an inner sealing component,
the outer structural component of the top structural edge of the lower module having an inner generally flat surface and a top generally flat surface wherein the inner generally flat surface and the top generally flat surface of the outer structural component of the top structural edge of the lower module are generally perpendicular,
the inner sealing component of the top structural edge of the lower module having an outer generally flat surface that abuts the inner generally flat surface of the outer structural component of the top structural edge of the lower module,
the inner sealing component of the top structural edge of the lower module having a top generally flat surface,
the bottom structural edge of the upper module comprising an outer structural component and an inner sealing component,
the outer structural component of the bottom structural edge of the upper module having an inner generally flat surface and a bottom generally flat surface,
the inner generally flat surface and the bottom generally flat surface of the outer structural edge of the upper module are generally perpendicular,
the bottom generally flat surface of the outer structural component of the bottom structural edge of the upper module being adjacent and supported by the top generally flat surface of the outer structural component of the top structural edge of the lower module,
the inner sealing component of the bottom structural edge of the upper module having an outer generally flat surface that abuts the inner generally flat surface of the bottom structural edge of the upper module,
the inner sealing component of the bottom structural edge of the upper module having a bottom generally flat surface,
and the bottom generally flat surface of the inner sealing component of the bottom structural edge of the upper module being adjacent the top generally flat surface of the inner sealing component of the top structural edge of the lower module.

13. The assembly of claim 12
wherein a sealing material extends between the bottom generally flat surface of the inner sealing component of the bottom structural edge of the upper module
and the top generally flat surface of the inner sealing component of the top structural edge of the lower module.

14. The assembly of claim 12
wherein the sealing material is a butyl tape.

15. The assembly of claim 12
wherein the sealing material is a silicon caulk.

16. The assembly of claim 12
wherein the sealing material is a rubber gasket.

17. The assembly of claim 12
wherein the outer structural component of the bottom structural edge of the upper module is a channel structural member.

18. The assembly of claim 12
wherein the top generally flat surface of the inner sealing component of the top structural edge of the lower module is generally perpendicular to the outer generally flat surface of the inner sealing component of the top structural edge of the lower module.

19. The assembly of claim 12
wherein the bottom generally flat surface of the inner sealing component of the bottom structural edge of the upper module is located below the bottom generally flat surface of the outer structural component of the bottom structural edge of the upper module.

20. The assembly of claim 10
wherein the bottom generally flat surface of the inner sealing component of the bottom structural edge of the upper module is generally perpendicular to the outer generally flat surface of the inner sealing component of the bottom structural edge of the upper module.

* * * * *